(12) United States Patent
Yamamuro et al.

(10) Patent No.: US 9,424,839 B2
(45) Date of Patent: Aug. 23, 2016

(54) SPEECH RECOGNITION SYSTEM THAT SELECTS A PROBABLE RECOGNITION RESULTING CANDIDATE

(71) Applicant: Mitsubishi Electric Corporation, Tokyo (JP)

(72) Inventors: Keita Yamamuro, Tokyo (JP); Youhei Okato, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 14/374,324

(22) PCT Filed: Nov. 29, 2013

(86) PCT No.: PCT/JP2013/082227
§ 371 (c)(1),
(2) Date: Jul. 24, 2014

(87) PCT Pub. No.: WO2015/079568
PCT Pub. Date: Jun. 4, 2015

(65) Prior Publication Data
US 2015/0348539 A1   Dec. 3, 2015

(51) Int. Cl.
| G10L 15/32 | (2013.01) |
| G10L 15/26 | (2006.01) |
| G10L 15/08 | (2006.01) |
| G10L 15/22 | (2006.01) |
| G10L 15/04 | (2013.01) |

(52) U.S. Cl.
CPC .............. G10L 15/08 (2013.01); G10L 15/04 (2013.01); G10L 15/22 (2013.01); G10L 15/26 (2013.01); G10L 15/32 (2013.01)

(58) Field of Classification Search
None
See application file for complete search history.

(56) References Cited

U.S. PATENT DOCUMENTS

| 5,526,466 | A  * | 6/1996 | Takizawa ........... G10L 15/1807 704/251 |
| 7,228,275 | B1 * | 6/2007 | Endo ..................... G10L 15/32 704/231 |
| 2010/0004930 | A1 * | 1/2010 | Strope .................... G10L 15/32 704/240 |
| 2010/0191530 | A1 * | 7/2010 | Nakano .................. G10L 15/32 704/244 |
| 2010/0211390 | A1 * | 8/2010 | Hillebrecht ............ G10L 15/08 704/240 |
| 2010/0217598 | A1 * | 8/2010 | Adachi ................... G10L 15/32 704/254 |
| 2012/0239394 | A1 * | 9/2012 | Matsumoto ............ G10L 25/84 704/233 |
| 2015/0228274 | A1 * | 8/2015 | Leppanen .............. G10L 15/20 704/243 |

FOREIGN PATENT DOCUMENTS

| JP | 7-72899 A | 3/1995 |
| JP | 9-292899 A | 11/1997 |
| JP | 2007-33671 A | 2/2007 |
| JP | 4826719 B2 | 11/2011 |

* cited by examiner

*Primary Examiner* — Pierre-Louis Desir
*Assistant Examiner* — Yi-Sheng Wang
(74) *Attorney, Agent, or Firm* — Birch, Stewart, Kolasch & Birch, LLP

(57) ABSTRACT

A system has a speech recognition unit 2 including a first recognition engine capable of recognizing predetermined word strings and a second recognition engine capable of recognizing parts of the word strings; and a deciding unit 4 that selects, in accordance with a difference between the durations of first and second recognition resulting candidates, which are recognition results of the speech recognition by the first and second recognition engines 2a and 2b, one or more probable recognition resulting candidates from the first and second recognition resulting candidates.

6 Claims, 9 Drawing Sheets

| Word Strings Recognizable by First Recognition Engine | Word Strings Recognizable by Second Recognition Engine |
|---|---|
| California Los Angeles | California |
| California San Diego | Arizona |
| California San Jose | New York |
| ⋮ | ⋮ |
| Texas Houston | Texas |
| ⋮ | ⋮ |

FIG.6

| First Recognition Resulting Candidates (Output Information of First Recognition Engine) | | | Second Recognition Resulting Candidates (Output Information of Second Recognition Engine) | | |
|---|---|---|---|---|---|
| Strings of Recognition Resulting Candidates | Reliability of Recognition Resulting Candidates | Duration of Recognition Resulting Candidates | Strings of Recognition Resulting Candidates | Reliability of Recognition Resulting Candidates | Duration of Recognition Resulting Candidates |
| California Los Angeles | 5900 | 4000 | California | 6000 | 2500 |
| California San Diego | 5800 | 4200 | Arizona | 5000 | 2800 |
| California San Jose | 5500 | 3200 | New York | 4000 | 1800 |
| ... | ... | ... | ... | ... | ... |
| Texas Houston | 4000 | 3800 | Texas | 4500 | 2100 |
| ... | ... | ... | ... | ... | ... |

FIG.9

| Strings of Recognition Resulting Candidates | Reliability of Recognition Resulting Candidates | Duration of Recognition Resulting Candidates | Difference from Acquired Speech Duration (Absolute Value) Acquired Speech Duration = 4100 | Compared Result with Second Threshold Threshold = 800 |
|---|---|---|---|---|
| California Los Angeles | 5900 | 4000 | 100 | Select (100<800) |
| California San Diego | 5800 | 4200 | 100 | Select (100<800) |
| California San Jose | 5500 | 3200 | 900 | Discard (900>800) |
| Texas Houston | 4000 | 3800 | 300 | Select (300<800) |
| California | 6000 | 2500 | 1600 | Discard (1600>800) |
| Arizona | 5000 | 2800 | 1300 | Discard (1300>800) |

SPEECH RECOGNITION SYSTEM THAT SELECTS A PROBABLE RECOGNITION RESULTING CANDIDATE

TECHNICAL FIELD

The present invention relates to a speech recognition system that selects a probable recognition resulting candidate from a plurality of speech recognition results, and outputs it.

BACKGROUND ART

Conventionally, a speech recognition system has been proposed which executes speech recognition by jointly using a plurality of recognition engines which differ in a field and environment of recognizable vocabulary, and obtains a probable recognition result from the recognition results acquired (see Patent Document 1, for example).

PRIOR ART DOCUMENT

Patent Document

Patent Document 1: Japanese Patent Laid-Open No. 2007-33671.

DISCLOSURE OF THE INVENTION

Problems to be Solved by the Invention

Conventionally, when selecting a final recognition result from the recognition results a plurality of recognition engines obtain, the speech recognition system selects the most likely recognition result by comparing reliability of the recognition results determined according to the individual standards of the plurality of recognition engines, or after sorting all the recognition results of the plurality of recognition engines in descending order of reliability.

Accordingly, it has a problem in that when a word or part of a word string (referred to as "word string" from now on, and the term "word string" is assumed to include a single word) recognizable by a first recognition engine agrees with a word string recognizable by a second recognition engine, the result to be recognized by the first recognition engine can be wrongly recognized as the result of the second recognition engine.

For example, consider the case where a first recognition engine is used with a second recognition engine capable of recognizing a word string shorter than that of the first recognition engine, and a string "California Los Angeles" is uttered. In this case, although the recognition result of the first recognition engine is to be selected as probable, the word "California" can be recognized by the second recognition engine. Thus, since the speech includes the word "California" which is recognizable by the first and second recognition engines, it is likely that the result of the second recognition engine is selected as the final recognition result depending on the reliability of the recognition results determined according to the individual standards of the first and second recognition engines.

The present invention is implemented to solve the foregoing problems. Therefore it is an object of the present invention to provide a speech recognition system capable of selecting a probable recognition resulting candidate from the speech recognition results of the recognition engines at high accuracy.

Means for Solving the Problems

A speech recognition system in accordance with the present invention comprises: a speech input unit that inputs speech; a speech recognition unit including a plurality of recognition engines that recognize the speech acquired from the speech input unit; and a deciding unit that selects, in accordance with differences between durations of recognition resulting candidates the plurality of recognition engines recognize, one or more recognition resulting candidates from the recognition resulting candidates.

Advantages of the Invention

According to the present invention, it offers an advantage of being able to select a probable recognition resulting candidate from the speech recognition results of the recognition engines at high accuracy.

BRIEF DESCRIPTION OF THE DRAWINGS

FIG. 6 is a table showing an example of output information of the first and second recognition engines;

FIG. 9 is a table showing an example of results of comparing durations of recognition resulting candidates with acquired speech duration.

BEST MODE FOR CARRYING OUT THE INVENTION

The best mode for carrying out the invention will now be described with reference to the accompanying drawings to explain the present invention in more detail.

Embodiment 1

Figure 1:
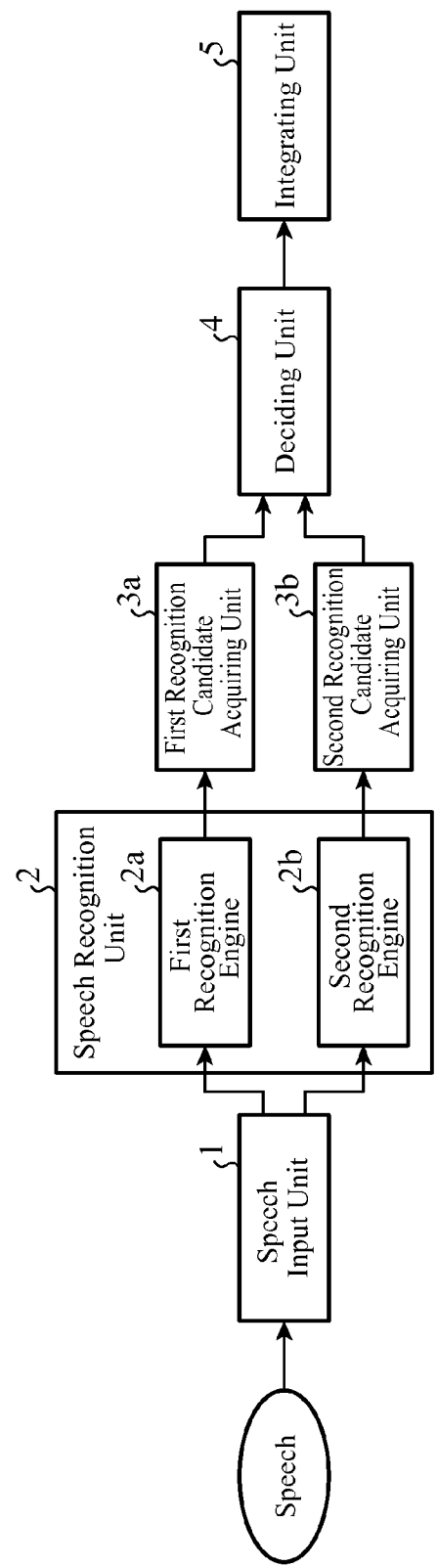
FIG. 1 is a block diagram showing a configuration of a speech recognition system of an embodiment 1 in accordance with the present invention.

FIG. 1 is a block diagram showing a configuration of a speech recognition system of an embodiment 1 in accordance with the present invention. The speech recognition system shown in FIG. 1 is a system used as an input means of a navigation system or audio system mounted or carried in a vehicle. The configuration comprises a speech input unit 1, a speech recognition unit 2, first and second recognition candidate acquiring units 3a and 3b, a deciding unit 4 and an integrating unit 5.

The speech input unit 1 has a function of picking up speech and acquiring an input signal. For example, it converts a speech signal supplied from a microphone to a digital signal.

The speech recognition unit 2 comprises first and second recognition engines 2a and 2b that carry out speech recognition of the same speech signal output from the speech input unit 1.

The first and second recognition engines 2a and 2b perform speech recognition processing of the input speech signal, and output a recognition resulting string, recognition resulting reliability and recognition resulting duration. It is assumed here that the first recognition engine can recognize at least one word string that includes as its part a word string recognizable by the second recognition engine.

Incidentally, the embodiment 1 is described below on the assumption that the number of words constituting a word string recognizable by the second recognition engine 2b is not greater than the number of words constituting a word string recognizable by the first recognition engine 2a.

Specifically, it is assumed that the first recognition engine 2a can recognize a word string consisting of a combination of a state name and a city name of the USA, and the second recognition engine 2b can recognize a state name.

In addition, although it is assumed in the embodiment 1 that the speech recognition unit 2 comprises the two recognition engines, it can comprise three or more recognition engines as long as the recognition engines can recognize at least one word string that includes as its part a word string recognizable by other recognition engines (it is the same in the embodiment 2).

The first and second recognition candidate acquiring units 3a and 3b are connected to the first and second recognition engines 2a and 2b of the speech recognition unit 2. The first and second recognition candidate acquiring units 3a and 3b acquire, from the speech recognition processing results of the first and second recognition engines 2a and 2b, not only recognition resulting strings as recognition resulting candidates, but also reliability of the recognition resulting candidates and the duration of the recognition resulting candidates.

Incidentally, it is assumed in the following description that the recognition resulting candidate acquired from the first recognition engine 2a by the first recognition candidate acquiring unit 3a is referred to as a "first recognition resulting candidate".

In addition, it is assumed that the recognition resulting candidate acquired from the second recognition engine 2b by the second recognition candidate acquiring unit 3b is referred to as a "second recognition resulting candidate".

The deciding unit 4 makes a right or wrong decision of the recognition resulting candidates in accordance with the differences between the durations of the first recognition resulting candidates and the durations of the second recognition resulting candidates. In the right or wrong decision, the deciding unit 4 discards the recognition resulting candidates decided as the wrong recognition, and selects the remaining recognition resulting candidates as probable recognition resulting candidates.

For example, the deciding unit 4 calculates the difference between the duration of the most reliable recognition resulting candidate of the first recognition resulting candidates and the durations of all the second recognition resulting candidates. Then it discards the second recognition resulting candidates which have the difference between the durations not less than a predetermined first threshold (or greater than the threshold). Then it selects the first recognition resulting candidates and the second recognition resulting candidates not discarded, and supplies them to the recognition result integrating unit 5.

As another method, for example, the deciding unit 4 calculates the difference between the duration of the most reliable recognition resulting candidate of the first recognition resulting candidates and the duration of the most reliable recognition resulting candidate of the second recognition resulting candidates. Then when the difference of the duration is not less than a predetermined first threshold (or greater than the threshold), it discards all the second recognition resulting candidates, and selects the first recognition resulting candidates. Then it supplies the selected recognition resulting candidates to the integrating unit 5.

The integrating unit 5 makes a single recognition resulting candidate group by combining the recognition resulting candidates the deciding unit 4 selects to be probable from among the recognition resulting candidates the first and second recognition candidate acquiring units 3a and 3b acquire, and sorts the recognition resulting candidates in the recognition candidate group in descending order of the reliability.

Incidentally, when the deciding unit 4 was unable to discard all the second recognition resulting candidates, the integrating unit 5 can correct the reliability of the individual recognition resulting candidates of the second recognition resulting candidates according to the differences between the duration of the most reliable recognition resulting candidate of the first recognition resulting candidates and the durations of the individual recognition resulting candidates of the second recognition resulting candidates, and can sort them in accordance with the reliability after the correction.

Figure 2:
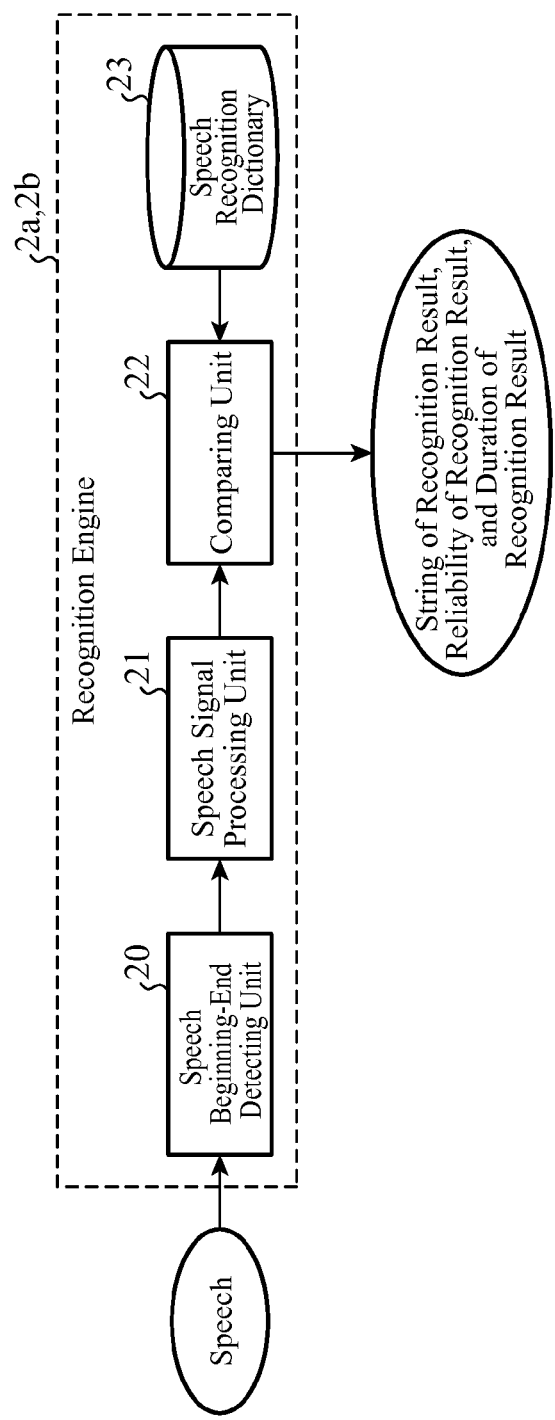
FIG. 2 is a block diagram showing a configuration of a recognition engine.

FIG. 2 is a block diagram showing a configuration of the recognition engine. As shown in FIG. 2, the first and second recognition engines 2a and 2b each comprise a detecting unit 20, a speech signal processing unit 21, a comparing unit 22 and a speech recognition dictionary 23.

The detecting unit 20 receives a speech signal output from the speech input unit 1, and detects the beginning time and end time of the speech of the speech signal. The speech duration (speech active section) of the speech signal decided from the beginning time and end time of the speech detected by the detecting unit 20 is supplied to the speech signal processing unit 21.

Figure 3:
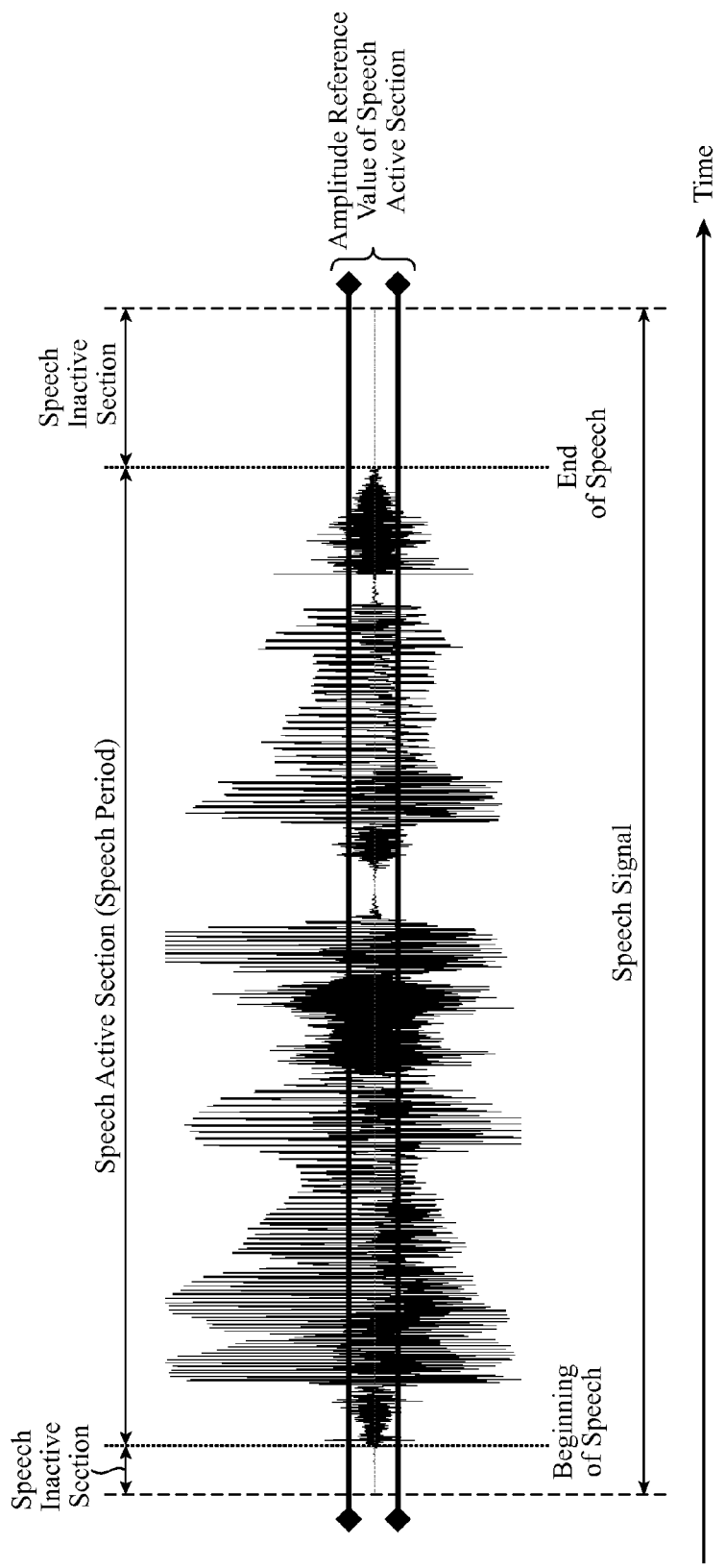
FIG. 3 is a diagram showing an example of speech beginning-end detection.

FIG. 3 is a diagram showing an example of the speech beginning-end detection. The detecting unit 20 detects the beginning time and the end time of the speech from the entire input speech signal, and classifies it into the speech inactive section and speech active section (speech duration). As shown in FIG. 3, the beginning and end of the speech are determined from the amplitude of the speech signal.

For example, as for the speech waveform of the speech signal, the point of time at which the amplitude exceeds an amplitude reference value first along the time base is determined as the beginning time of the speech. In addition, the point of time at which the amplitude exceeds the amplitude reference value last along the time base is determined as the end time of the speech.

The speech signal processing unit 21 receives the speech active section of the speech signal detected by the detecting unit 20, executes signal processing such as Fast Fourier Transform, filter analysis, linear predictive analysis, and cepstrum analysis for the speech active section, and extracts speech feature parameters. The speech feature parameters are supplied to the comparing unit 22.

The comparing unit 22 compares the speech feature parameters of the speech signal extracted by the speech signal processing unit 21 with a plurality of speech feature parameters stored in the speech recognition dictionary 23, and outputs a recognition result having speech feature parameters with a high degree of similarity with the speech feature parameters recorded in the speech recognition dictionary 23. Here, the comparing unit 22 outputs a value obtained by normalizing the degree of similarity as recognition resulting reliability. Furthermore, it outputs the recognition resulting duration calculated at the time of the comparing processing.

The speech recognition dictionary 23 is dictionary data consisting of one or more word strings to be recognized which are recorded together with their speech feature parameters. In the embodiment 1, the first and second recognition engines 2a and 2b have the speech recognition dictionary 23 recording word strings of different length each.

The speech recognition dictionary 23 of the first recognition engine 2a records at least one word string which includes part of a word string recorded in the speech recognition dictionary 23 of the second recognition engine 2b.

The word strings recorded in the speech recognition dictionary 23 vary in accordance with the recognition mode of the speech recognition system. For example, when the recognition mode of addresses is set, the speech recognition dictionary 23 of the first recognition engine 2a records word strings belonging to a category of addresses such as "California Los Angeles" and "California San Diego".

On the other hand, since the second recognition engine 2b is a recognition engine that recognizes a word string shorter than the first recognition engine 2a, the speech recognition dictionary 23 of the second recognition engine 2b records a word such as "California".

Figures 4, 5:
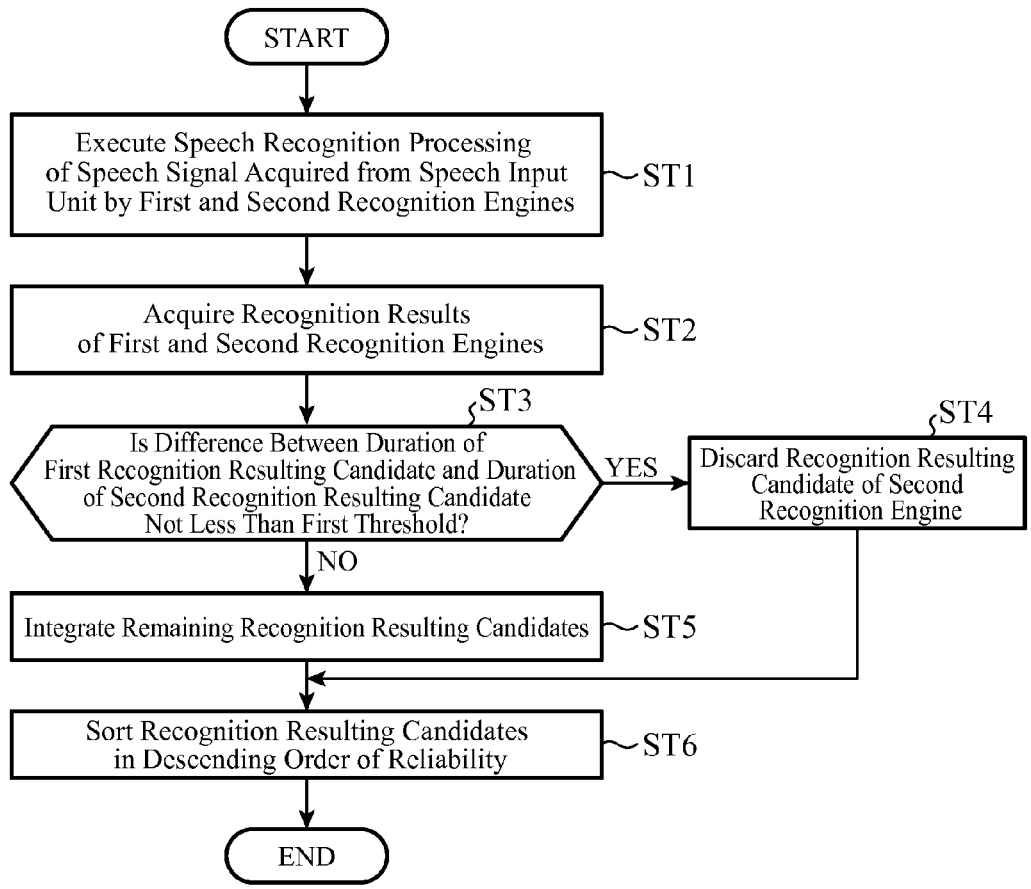
FIG. 4 is a table showing an example of word strings recognizable by first and second recognition engines.
FIG. 5 is a flowchart showing the operation of the speech recognition system of the embodiment 1.

In this way, in FIG. 4, the word "California" recorded in the speech recognition dictionary 23 of the second recognition engine 2b is repeated in the word strings such as "California Los Angeles" and "California San Diego" recorded in the speech recognition dictionary 23 of the first recognition engine 2a.

Incidentally, although FIG. 4 shows an example which records the word strings belonging to the category of addresses in the speech recognition dictionary 23 of the recognition mode of the speech recognition system, the speech recognition dictionaries 23 of the first and second recognition engines 2a and 2b can record word strings belonging to the category of names by setting the recognition mode of names. Thus, altering the mode enables the speech recognition dictionaries 23 to record word strings belonging to a category other than the addresses or names.

Incidentally, the speech input unit 1, speech recognition unit 2, first and second recognition candidate acquiring units 3a and 3b, deciding unit 4 and integrating unit 5 can be implemented as a concrete means in which hardware and software cooperate with each other by causing a microcomputer to execute programs that describe the processing particular to the present invention.

Next, the operation will be described.

FIG. 5 is a flowchart showing the operation of the speech recognition system of the embodiment 1.

First, the first recognition engine 2a and second recognition engine 2b, which have the different speech recognition dictionaries 23, perform the speech recognition processing of the speech signal supplied from the speech input unit 1 (step ST1). As shown in FIG. 4, it is assumed here that the first recognition engine can recognize at least one word string that includes as its part a word string recognizable by the second recognition engine.

Next, the first and second recognition candidate acquiring units 3a and 3b acquire the strings of the recognition resulting candidates, the reliability of the recognition resulting candidates and the durations of the recognition resulting candidates from the first and second recognition engines 2a and 2b (step ST2). The speech recognition processing results of the first and second recognition engines 2a and 2b are supplied from the first and second recognition candidate acquiring units 3a and 3b to the deciding unit 4.

The deciding unit 4 calculates the difference between the duration of the recognition resulting candidate with the highest reliability among the first recognition resulting candidates and the duration of the recognition resulting candidate with the highest reliability among the second recognition resulting candidates. In this way, estimating the probability of the recognition results according to the difference between the durations of the recognition resulting candidates detected by the speech recognition of the first and second recognition engines 2a and 2b and according to the reliability of the recognition resulting candidates makes it possible to select a more probable recognition resulting candidate at higher accuracy.

Next, the deciding unit 4 decides on whether the difference between the duration of the most reliable recognition resulting candidate among the first recognition resulting candidates and the duration of the most reliable recognition resulting candidate among the second recognition resulting candidates is not less than the predetermined first threshold or not (step ST3).

It is assumed here that the first threshold is a value the deciding unit 4 obtains by calculating in advance the differences between the durations of the word strings which are recorded in the speech recognition dictionary 23 of the first recognition engine 2a and in the speech recognition dictionary 23 of the second recognition engine 2b, and by carrying out statistical processing of them, for example.

In this case, the first threshold is set variably in accordance with the categories of the word strings recorded in the speech recognition dictionary 23 of the first recognition engine 2a and in the speech recognition dictionary 23 of the second recognition engine 2b.

In other words, the deciding unit 4 alters the first threshold in accordance with the recognition mode because the speech recognition dictionaries 23 record the word strings belonging to the category corresponding to the recognition mode of the speech recognition system as described with reference to FIG. 4. In this way, the deciding unit 4 can discard a recognition resulting candidate at higher accuracy by considering the recognition mode of the speech recognition system.

If the difference between the durations is not less than the first threshold (YES at step ST3), the deciding unit 4 discards the second recognition resulting candidates (step ST4). In this way, when utilizing the recognition engines with different recognizable word string lengths, the right or wrong decision based on the difference between the durations of the recognition resulting candidates enables discarding a wrongly recognized recognition resulting candidate at higher accuracy.

On the other hand, if the difference between the durations of the recognition resulting candidates is less than the first threshold (NO at step ST3), the first and second recognition resulting candidates are supplied from the deciding unit 4 to the integrating unit 5. Acquiring the first and second recognition resulting candidates from the deciding unit 4, the integrating unit 5 combines them to a single recognition resulting candidate group (step ST5).

When combining the first and second recognition resulting candidates, or when receiving the remaining first recognition resulting candidates after the second recognition candidates are discarded in the processing at step ST4, the integrating unit 5 sorts the recognition resulting candidates in descending order of reliability (step ST6). In this way, the system can provide a user with a result of selecting the probable recognition resulting candidates in accordance with the degree of reliability.

Incidentally, if the difference between the durations of the recognition resulting candidates is less than the first threshold (NO at step ST3) and the deciding unit 4 cannot discard the second recognition resulting candidates, the integrating unit 5 can correct the reliability of the individual second recognition resulting candidates by the difference between the durations of the recognition resulting candidates calculated at step ST3, and can sort on the basis of the reliability after the correction.

In addition, the candidates from the top to a predetermined ranking can be output as the final recognition resulting candidates.

Next, a description will be made with reference to a concrete example.

If the speech "California Los Angeles" is uttered, the speech input unit 1 picks up the speech, and supplies the speech signal "California Los Angeles" to the first and second recognition engines 2a and 2b.

The first and second recognition engines 2a and 2b perform the speech recognition processing of the speech signal "California Los Angeles". It is assumed here that the speech recognition dictionaries 23 of the first and second recognition engines 2a and 2b record the word strings shown in FIG. 4.

Next, the first and second recognition candidate acquiring units 3a and 3b acquire the strings of the recognition resulting candidates, the reliability of the recognition resulting candidates, and the durations of the recognition resulting candidates from the first and second recognition engines 2a and 2b, and supply them to the deciding unit 4. FIG. 6 shows an example of the first and second recognition resulting candidates acquired by the first and second recognition candidate acquiring units 3a and 3b.

The deciding unit 4 calculates the difference 1500 ms by subtracting the duration 2500 ms of the most reliable candidate "California" among the second recognition resulting candidates from the duration 4000 ms of the most reliable candidate "California Los Angeles" among the first recognition resulting candidates.

After that, the deciding unit 4 compares the difference 1500 ms between the durations with the predetermined first threshold. Incidentally, the first threshold is set at 1000 ms, considering the difference between the durations of the word strings recorded in the speech recognition dictionaries 23 of the individual recognition engines.

Since the difference 1500 ms between the individual durations of the recognition resulting candidates is not less than the first threshold 1000 ms, the deciding unit 4 discards all the second recognition resulting candidates.

For example, the candidate with the highest reliability among the first and second recognition resulting candidates is "California" with the reliability 6000, which is the second recognition resulting candidate. Accordingly, even though the speech "California Los Angeles" is actually uttered, the conventional system which employs the reliability as the selection standard is likely to output "California" which is obtained as the final recognition result by the speech recognition of the second recognition engine 2b.

In contrast with this, according to the present invention, since the candidate "California" is discarded by the difference between the durations of the recognition resulting candidates, the system can select the right recognition result "California Los Angeles" appropriately as the final recognition result.

Finally, the integrating unit 5 sorts the first recognition resulting candidates in descending order of the reliability.

Here, if the difference between the individual durations of the recognition resulting candidates is less than the first threshold and the second recognition resulting candidates are not discarded, the integrating unit 5 can correct the reliability of the individual second recognition resulting candidates in accordance with the difference between the durations of the recognition resulting candidates, and sort them on the basis of the reliability after the correction.

For example, when correcting the reliability of the second recognition resulting candidates shown in FIG. 6, the integrating unit 5 calculates the differences between the duration of the most reliable recognition resulting candidate among the first recognition resulting candidates and the durations of all the second recognition resulting candidates. Next, it calculates weights for the individual recognition resulting candidates from the differences between the durations of all the recognition resulting candidates, and corrects the reliability by multiplying the reliability of the individual recognition resulting candidates by the weights. For example, the integrating unit 5 corrects the reliability in the direction of reducing the reliability by assigning the weight "1" when the difference is "0" and by reducing the weight toward zero as the difference increases.

As described above, according to the present embodiment 1, it comprises the speech recognition unit 2 including the first recognition engine capable of recognizing predetermined word strings and the second recognition engine capable of recognizing part of the foregoing word strings; and the deciding unit 4 that selects one or more probable recognition resulting candidates from the first and second recognition resulting candidates in accordance with the differences between the durations of the first and second recognition resulting candidates which are the recognition result of the speech recognition of the first and second recognition engines 2a and 2b.

The configuration thus arranged can discriminate the recognition resulting candidates with clearly wrong duration among the first and second recognition resulting candidates which are the recognition results of the first and second recognition engines 2a and 2b, and select the other recognition resulting candidates as the probable candidates. Thus, it can select the probable recognition resulting candidates at higher accuracy from the first and second recognition resulting candidates which are the recognition results of the first and second recognition engines 2a and 2b.

In addition, according to the present embodiment 1, the speech recognition unit 2 comprises the first recognition engine capable of recognizing the predetermined word strings and the second recognition engine capable of recognizing part of the foregoing word strings, wherein the deciding unit 4 discards the second recognition resulting candidates when the difference between the durations of the first and second recognition resulting candidates the first and second recognition engines 2a and 2b recognize is not less than the predetermined first threshold, and selects the first recognition resulting candidates as the probable candidates. In this way, making the right or wrong decision based on the difference between the durations of the recognition resulting candidates enables discarding the wrongly recognized recognition resulting candidates at high accuracy.

Furthermore, according to the present embodiment 1, the deciding unit 4 estimates the probability of the recognition resulting candidates according to the difference between the durations of the first and second recognition resulting candidates which are the recognition results of the first and second recognition engines 2a and 2b and according to the reliability of the recognition resulting candidates. In this way, it can select the probable recognition resulting candidates at higher accuracy.

Moreover, according to the present embodiment 1, the deciding unit 4 alters the first threshold in accordance with the category of the recognition target word string. In this way, it can select the recognition resulting candidates at higher accuracy by considering the recognition mode.

Embodiment 2

Figure 7:
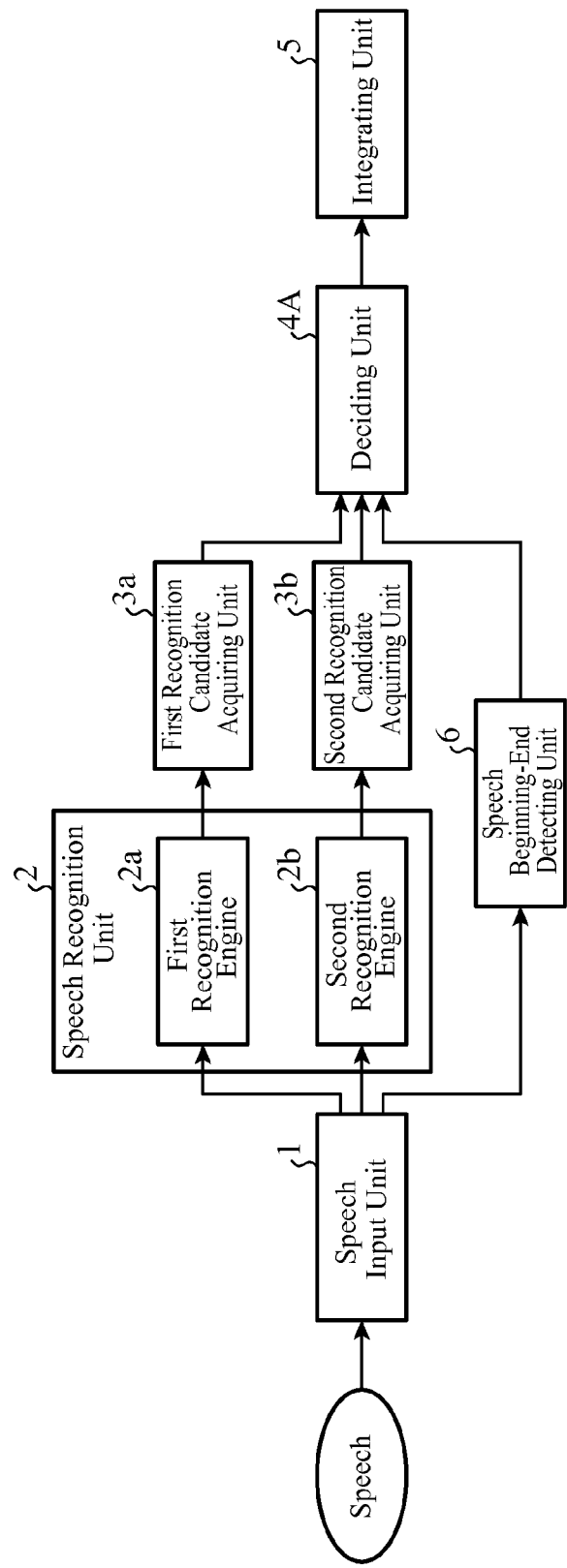
FIG. 7 is a block diagram showing a configuration of a speech recognition system of an embodiment 2 in accordance with the present invention.

FIG. 7 is a block diagram showing a configuration of a speech recognition system of an embodiment 2 in accordance with the present invention. The speech recognition system shown in FIG. 7 is a system used as an input means of a navigation system or audio system mounted or carried in a vehicle, for example, as in the embodiment 1.

It comprises the speech input unit 1, speech recognition unit 2, first and second recognition candidate acquiring units 3a and 3b, deciding unit 4A, integrating unit 5 and a detecting unit 6.

Incidentally, in FIG. 7, the same components as those of FIG. 1 are designated by the same reference symbols and their description will be omitted.

The foregoing embodiment 1 makes a right or wrong decision of the recognition resulting candidates by comparing the durations of the first and second recognition resulting candidates which are the recognition results of the speech recognition of the two or more recognition engines.

In contrast with this, the embodiment 2 comprises the detecting unit 6 separately from the recognition engines, and the deciding unit 4A employs the speech duration (referred to as "acquired speech duration" from now on) of the speech the detecting unit 6 detects as a reference value of the right or wrong decision. Here, the speech is acquired by the speech input unit 1.

The detecting unit 6 determines the acquired speech duration which is the reference value to be compared with the durations of the individual recognition resulting candidates by the deciding unit 4A. For example, in the same manner as the detecting unit 20 in the recognition engines, the detecting unit 6 detects the acquired speech duration from the speech signal supplied from the speech input unit 1, and supplies it to the deciding unit 4A.

Incidentally, since the first and second recognition engines 2a and 2b can execute different speech recognition processing each, the recognition engines sometimes calculate the speech duration information using different algorithms.

In addition, the acquired speech duration output from the detecting unit 6 becomes a reference value for comparing the recognition engines using different algorithms. As an example of the recognition engines using different speech recognition algorithms, there are VoCon of Nuance Communications, Inc., Google voice search of Google Inc., and Julius of Nagoya Institute of Technology and Kyoto University. The names of the recognition engines are registered as a trademark each.

Incidentally, the speech input unit 1, speech recognition unit 2, first and second recognition candidate acquiring units 3a and 3b, deciding unit 4A, integrating unit 5 and detecting unit 6 can be implemented as a concrete means in which hardware and software cooperate with each other by causing a microcomputer to execute programs that describe the processing particular to the present invention.

Next, the operation will be described.

Figure 8:
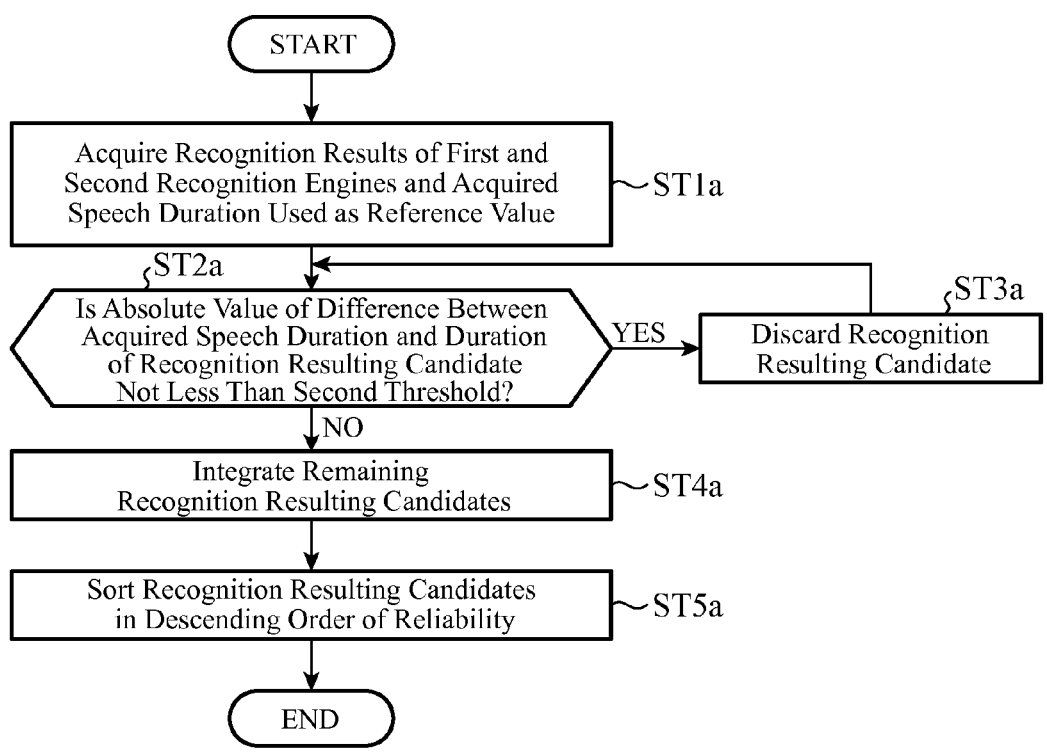
FIG. 8 is a flowchart showing the operation of the speech recognition system of the embodiment 2.

FIG. 8 is a flowchart showing the operation of the speech recognition system of the embodiment 2.

First, the first recognition engine 2a and second recognition engine 2b perform the speech recognition processing of the speech signal supplied from the speech input unit 1. Here, the detecting unit 6 detects the acquired speech duration from the speech signal input by the speech input unit 1.

The first and second recognition candidate acquiring units 3a and 3b acquire the strings of the recognition resulting candidates, the reliability of the recognition resulting candidates and the durations of the recognition resulting candidates from the first and second recognition engines 2a and 2b. The speech recognition processing results of the first and second recognition engines 2a and 2b are supplied from the first and second recognition candidate acquiring units 3a and 3b to the deciding unit 4A. In addition, the acquired speech duration the detecting unit 6 detects is supplied to the deciding unit 4A as the reference value.

The deciding unit 4A acquires the strings of the recognition resulting candidates obtained from the first and second recognition candidate acquiring units 3a and 3b, the reliability of the recognition resulting candidates and the durations of the recognition resulting candidates, and the acquired speech duration which the detecting unit 6 detects and becomes the reference value (step ST1a).

After that, the deciding unit 4A calculates the difference between the duration of each of all the recognition resulting candidates acquired from the first and second recognition candidate acquiring units 3a and 3b and the acquired speech duration used as the reference value, and obtains the absolute value of the difference.

Next, the deciding unit 4A compares the absolute value of the difference with a predetermined second threshold, and decides on whether the absolute value of the difference is not less than the second threshold or not (step ST2a).

If the absolute value of the difference is not less than the second threshold (YES at step ST2a), the deciding unit 4A discards the recognition resulting candidate as to which the absolute value of the difference is obtained (step ST3a). After that, it returns to the processing at step ST2a, and repeats the right or wrong decision until the processing completes as to all the recognition resulting candidates.

Next, the integrating unit 5 combines the remaining recognition resulting candidates which are not discarded by the deciding unit 4A among the first and second recognition resulting candidates into a single recognition resulting candidate group (step ST4a).

Finally, the integrating unit 5 sorts the recognition resulting candidates in the recognition resulting candidate group in descending order of the reliability (step ST5a). Here, the integrating unit 5 carries out the correction of reducing the reliability of the recognition resulting candidates for the individual recognition resulting candidates in the recognition resulting candidate group in accordance with the differences between the durations of the recognition resulting candidates and the acquired speech duration calculated at step ST2a and used as the reference value.

More specifically, the integrating unit 5 corrects the reliability of each first recognition resulting candidate that cannot be discarded in the direction of reducing the reliability in accordance with the difference between the duration of the first recognition resulting candidate that cannot be discarded and the acquired speech duration, and corrects the reliability of each second recognition resulting candidate that cannot be discarded in the direction of reducing the reliability in accordance with the difference between the duration of the second recognition resulting candidate that cannot be discarded and the acquired speech duration. Then it can sort in accordance with the reliability after the correction. In addition, the candidates from the top to a predetermined ranking can be output as the final recognition resulting candidates.

Next, a description will be made with reference to a concrete example.

FIG. 9 is a table showing an example of the results of comparing the durations of the recognition resulting candidates with the acquired speech duration, in which a right or wrong decision is made as to six recognition resulting candidates using the second threshold. In FIG. 9, the acquired speech duration is set at 4100 ms, and the second threshold for the right or wrong decision is set at 800 ms.

For example, as to the recognition resulting candidate "California Los Angeles", calculating the absolute value of the difference from the acquired speech duration will give 100 which is less than the second threshold 800. Thus, the recognition resulting candidate is selected as a probable recognition resulting candidate.

On the other hand, as to the recognition resulting candidate "California San Jose", the absolute value of the difference from the acquired speech duration is 900 which is greater than the second threshold 800. Thus, the recognition resulting candidate is discarded.

The deciding unit 4A executes the same processing as described above for all the recognition resulting candidates.

In addition, as for the acquired speech duration used as the reference value, the detecting unit 6 determines it in accordance with the recognition mode of the speech recognition system, that is, the category of the recognition target word string.

Figure 10:
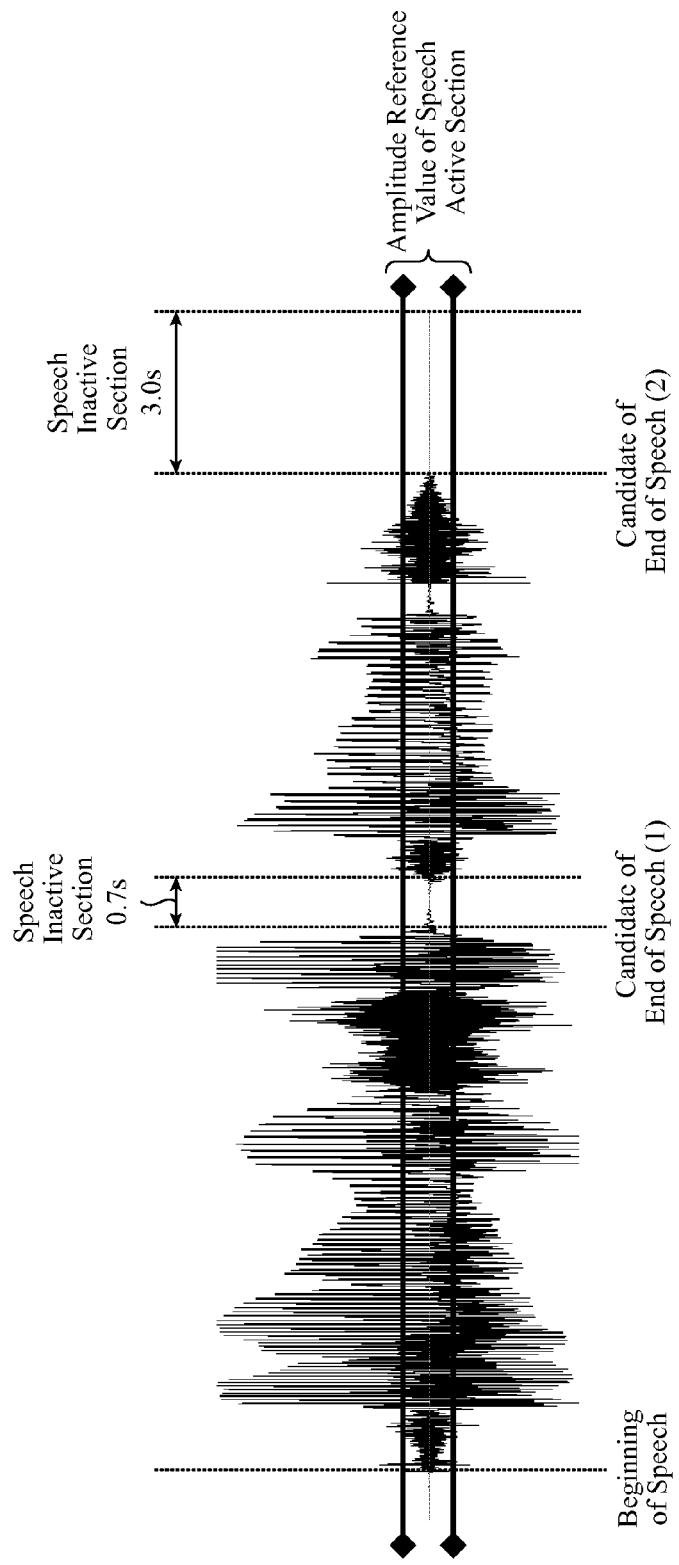
FIG. 10 is a diagram showing processing of determining a reference value of speech duration using a set value in accordance with a category of a recognition target word string.

FIG. 10 is a diagram showing the processing of determining the acquired speech duration used as the reference value by using a set value corresponding to the category of the recognition target word string. The detecting unit 6 determines as the beginning time of the speech a point of time at which it is detected in the speech waveform of the input speech signal that the amplitude exceeds the amplitude reference value first along the time base.

In addition, it determines as an end candidate an interval at which the amplitude becomes less than the amplitude reference value along the time base, followed by detecting the amplitude exceeding the amplitude reference value.

FIG. 10 shows an example having two end candidates of the speech. A candidate (1) has a speech inactive section of 0.7 sec., and a candidate (2) has a speech inactive section of 3.0 sec.

In addition, the detecting unit 6 has a third threshold set in accordance with the category of the recognition target word string for detecting the end time of speech.

More specifically, when the speech inactive section of the end candidate continues not less than the third threshold, the detecting unit 6 detects the candidate as the end position of the input speech signal.

In the case of FIG. 10, the third threshold is set at 1.0 sec. or more for the recognition mode of addresses, that is, if the category of the recognition target word string is "address", and is set at 0.5 sec. or more for the recognition mode of phone numbers, that is, if the category of the recognition target word string is "phone number".

When the recognition mode address is set, the detecting unit 6 detects the candidate (2) as to which the speech inactive section continues 1.0 sec. or more as the end of speech. In contrast, if the recognition mode phone number is set, the detecting unit 6 detects the candidate (1) as to which the speech inactive section continues 0.5 sec. or more as the end of speech. Incidentally, the third threshold for the end detection can be altered according to the category of the recognition target word string.

The detecting unit 6 detects the acquired speech duration used as the reference value by detecting the end of speech by the third threshold corresponding to the category of the recognition target word string as described above. Thus, the detecting unit 6 determines the acquired speech duration used as the reference value from the category of the recognition target word string and the speech waveform of the input speech. Since a user gives speech in conformity with the recognition mode of the speech recognition system, determining the reference value from the category of the recognition target word string and the speech waveform of the input speech enables detecting the reference value corresponding to the real input speech. This enables selecting a probable recognition candidate at higher accuracy.

Incidentally, although FIG. 7 shows the configuration in which the speech recognition unit 2 comprises the first and second recognition engines 2a and 2b, the speech recognition unit 2 can comprise two or more recognition engines.

As described above, according to the present embodiment 2, it comprises the speech recognition unit 2 including the first and second recognition engines 2a and 2b that recognize the input speech; and the deciding unit 4A that selects the probable recognition resulting candidates from the recognition resulting candidates which are the recognition results of the first and second recognition engines 2a and 2b according to the differences between the durations of the recognition resulting candidates which are the recognition results of the first and second recognition engines 2a and 2b and the acquired speech duration detected by the detecting unit 6 separately provided from the detecting unit 20 of the recognition engines.

The configuration thus arranged can discriminate, in the same manner as the foregoing embodiment 1, the recognition resulting candidates with clearly wrong durations among the recognition resulting candidates which are the recognition results of the first and second recognition engines 2a and 2b, and select the remaining recognition resulting candidates as the probable candidates. Thus, it can select the probable recognition resulting candidates at higher accuracy from the recognition resulting candidates which are the recognition results of the first and second recognition engines 2a and 2b.

In addition, according to the present embodiment 2, the deciding unit 4A discards the recognition resulting candidates as to which the differences between the durations of the recognition resulting candidates detected by the speech recognition of the first and second recognition engines 2a and 2b and the acquired speech duration are not less than the predetermined second threshold, and select the remainder as the probable recognition resulting candidates.

In this way, making a right or wrong decision by the differences between the durations of the recognition resulting candidates and the acquired speech duration enables discarding the wrongly recognized recognition resulting candidates at higher accuracy.

Furthermore, according to the present embodiment 2, it comprises the detecting unit 6 that determines the acquired speech duration from the category of the recognition target word string and from the waveform of the input speech.

The configuration thus arranged enables detecting the reference value corresponding to the real input speech. This makes it possible to select the probable recognition resulting candidates at higher accuracy.

Incidentally, it is to be understood that a free combination of the individual embodiments, variations of any components of the individual embodiments or removal of any components of the individual embodiments is possible within the scope of the present invention.

INDUSTRIAL APPLICABILITY

A speech recognition system in accordance with the present invention can select probable recognition resulting candidates from the speech recognition results of the recognition engines at high accuracy. Accordingly, it is suitably applied to an input means of an onboard navigation system and the like, for example.

DESCRIPTION OF REFERENCE SYMBOLS

1 speech input unit; 2 speech recognition unit; 2a first recognition engine; 2b second recognition engine; 3a first recognition candidate acquiring unit; 3*b* second recognition candidate acquiring unit; 4 deciding unit; 5 integrating unit; 6; 20 detecting unit; 21 speech signal processing unit; 22 comparing unit; 23 speech recognition dictionary.

What is claimed is:

1. A speech recognition system comprising:
an interface that acquires speech inputted via a microphone;
a speech recognizer comprising at least a first recognition engine and a second recognition engine that perform recognition of the acquired speech, wherein the first recognition engine is configured to recognize at least one word string partially comprised of a word string recognizable by the second recognition engine; and
a processor programmed to execute a process for determining a recognized speech that includes
obtaining a list of recognition candidates that are recognized by the first and second recognition engines as a result of performing recognition on the acquired speech, said recognition candidates including a first recognition result recognized by the first recognition engine and a second recognition result recognized by the second recognition engine, recognize,
calculating a difference in duration between the first and second recognition results by subtracting the duration of the second recognition result from the duration of the first recognition result,
comparing the difference in duration to a first threshold set in advance,
when the difference in duration meets or exceeds the first threshold, updating the list of recognition candidates by discarding the second recognition result, and selecting the recognized speech from the updated list of first recognition candidates.

2. The speech recognition system according to claim 1, wherein
if the difference in duration is less than the first threshold, the process reduces, in accordance with the difference in duration, a reliability score of the second recognition result.

3. The speech recognition system according to claim 1, wherein the decider processor alters the first threshold set in advance in accordance with a category of a recognition target word string.

4. The speech recognition system according to claim 1, in which an acquired speech duration from beginning to end of the acquired speech is detected, wherein
the process further comprises discarding, from the list of recognition candidates, a recognition resulting candidate whose duration is not within a second threshold amount of the acquired speech duration, the second threshold being set in advance.

5. The speech recognition system according to claim 4, wherein
the process reduces, in accordance with the respective differences between the durations of the non-discarded recognition candidates in the list and the acquired speech duration, reliability scores of the respective non-discarded recognition candidates in the list.

6. The speech recognition system according to claim 4, wherein the acquired speech duration is determined in accordance with the category of a recognition target word string and a threshold of end detection of the acquired speech.

\* \* \* \* \*